UNITED STATES PATENT OFFICE.

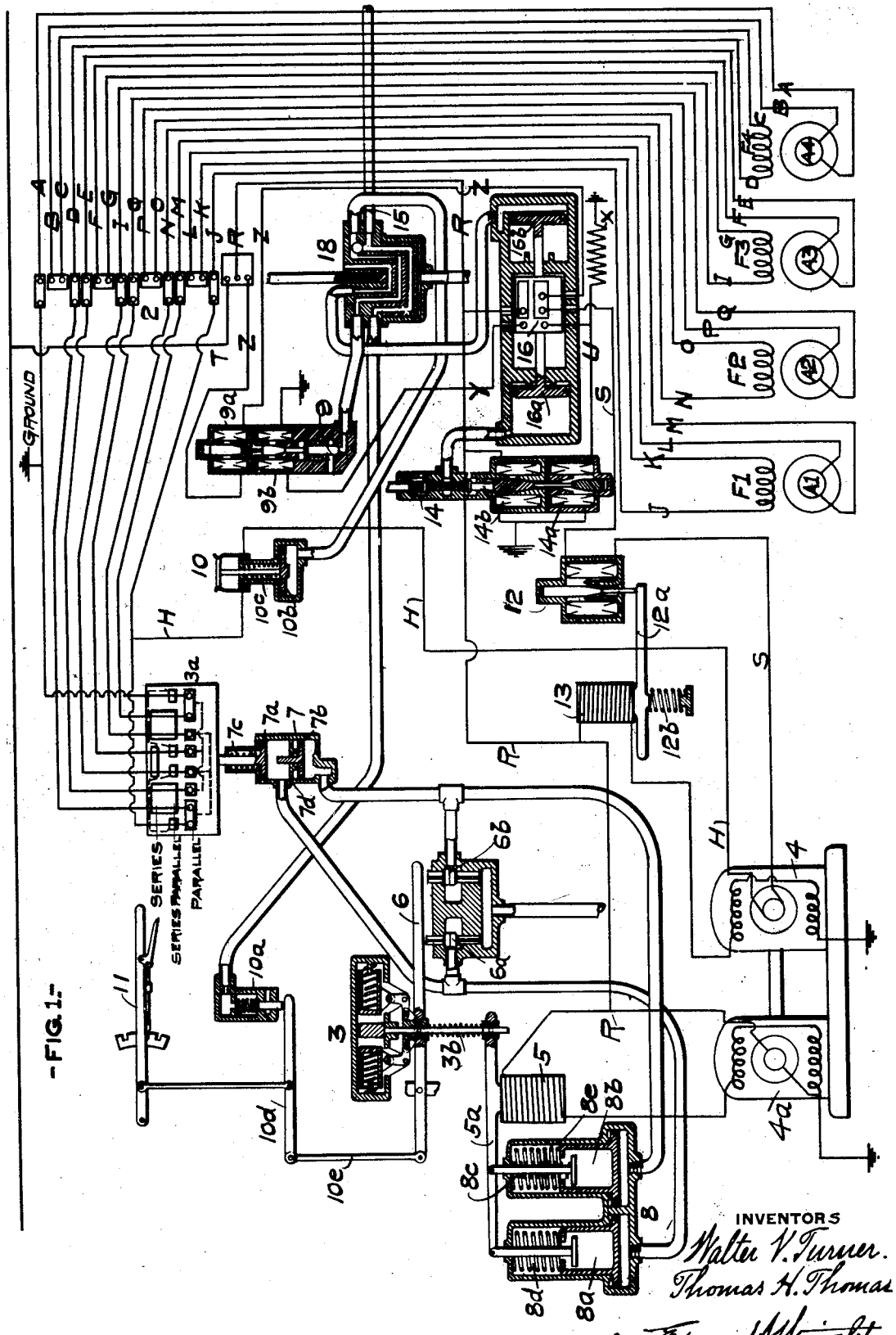

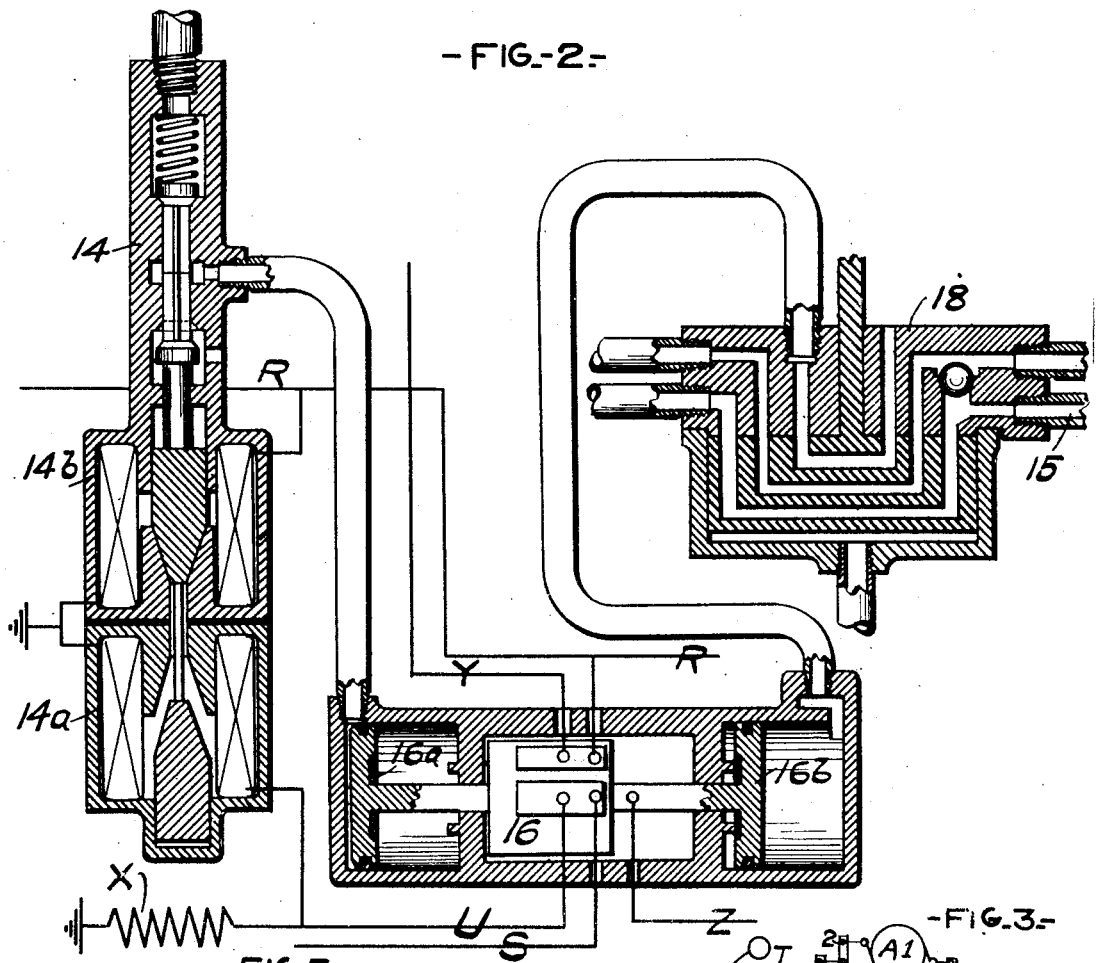
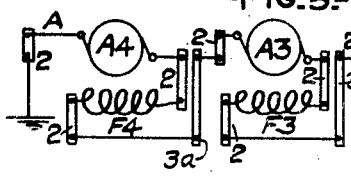
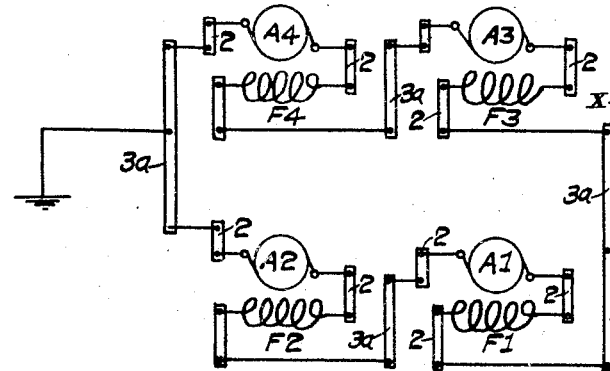
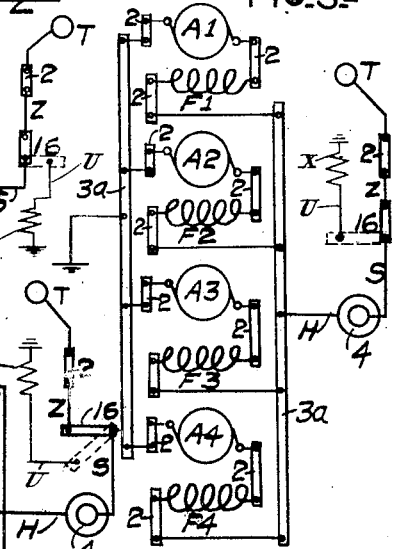

WALTER V. TURNER, OF WILKINSBURG, AND THOMAS H. THOMAS, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

REGENERATIVE BRAKING SYSTEM FOR SERIES MOTORS.

1,322,845.      Specification of Letters Patent.      Patented Nov. 25, 1919.

Application filed September 6, 1916. Serial No. 118,608.

*To all whom it may concern:*

Be it known that we, WALTER V. TURNER and THOMAS H. THOMAS, citizens of the United States, residing at, respectively, Winkinsburg and Edgewood, in the county of Allegheny and State of Pennsylvania, have jointly invented a certain new and useful Improvement in Regenerative Braking Systems for Series Motors, of which improvement the following is a specification.

This invention relates to regenerative braking systems for electric traction where direct current is employed for propelling the vehicles, such as shown and described in our prior application Serial No. 76,237, filed February 5, 1916. In said prior application, the improvement is shown as applied to a four motor car equipment, in which the field coils of the motors may be connected in parallel for series excitation in propelling the car, and connected in series and supplied with current from the line when operating as generators in regenerative braking. The reason for this special arrangement is that the field resistance for a series motor is so low that, if the fields be left in parallel when regenerative braking is started, the amount of current flowing through them would be prohibitive. As the fields of these special motors are of a higher resistance than usual, in order to keep down the current while regenerating from line excitation, it is necessary to shift from a series to a parallel connection when propelling the car.

The object of our present invention is to provide means whereby the usual form of series-wound motor may be employed, and it provides that the motor field of the usual low resistance shall be permanently connected in series with the motor armature, which is the usual arrangement for a railway motor, and thereby make it unnecessary to use a separate supply of current from the line to energize the fields in regenerative braking.

According to another feature of our improvement, the circuit between the motors acting as generators and the line is not connected when electro dynamic braking is first started, but the circuit is closed through a resistance; then as the voltage is built up from the residual magnetism of the fields to a point greater than that of the line the connection is automatically shifted to the line to permit the current to be restored thereto.

In the accompanying drawings: Figure 1 is a diagram of a regenerative braking system embodying our improvement; Fig. 2, a sectional diagrammatic view showing the controller valve and fluid pressure actuated switch on a larger scale; Figs. 3, 4 and 5, circuit diagrams illustrating the course of the current in the regenerative circuit in the three different positions of the automatic series-parallel switch, respectively.

We will first describe the apparatus in so far as the same corresponds with that of our prior application above referred to.

The electric connections, including the circuits, controllers, switches, etc., for controlling the motors in propelling the vehicle, are not shown in the drawing, and only a sufficient number of contacts representing a brake switch or controller, 2, are shown connected to the local or regenerative circuits of the generators as are necessary to illustrate the operations during the regenerative braking periods. The contacts of the brake switch, 2, are indicated in the closed position, that is the position to which this switch is moved to open the propelling circuits and connect up the motors to act as generators in the regenerative circuit for braking purposes and for restoring energy to the line.

It will be understood that the contacts for the brake switch, 2, may be mounted upon or operated by the running controller or master controller when turned to a certain braking position, or may be operated by a separate switch handle, or be connected up to the propelling system in any suitable or preferred manner, and it is not deemed necessary to further illustrate the circuits and control of said propelling system, since it is well understood by those familiar with the art as to how the regenerative system, as herein illustrated, may be properly connected into the propelling system of the motors.

In the drawing, we have illustrated, diagrammatically, a four motor equipment, comprising standard series-wound motors having armatures $A^1$, $A^2$, $A^3$ and $A^4$, connected by suitable leads, M, L, Q, P, E, F, A and B, with the controller switch, 2, and corresponding fields F¹, F², F³ and F⁴, also connected by leads, J, K, N, O, I, G, C and D, with the controller switch. This switch is provided with a set of contact bars for connecting the leads, A, D, E, I, Q, N, M, and J, with corresponding contact fingers on the series-parallel change-over switch, 3ª, while other contact bars on switch, 2, connect a field lead and an armature lead of each motor when in braking position. The change over switch, 3ª, may be operated by various forms of speed controlled means which serve to shift the relation of the generators according to certain variations in the speed of the vehicle, the means, as shown, comprising a centrifugal governor, 3, the shaft of which may be driven from an axle of the vehicle and operate through lever 6, to open and close the valves, 6ª and 6ᵇ, for controlling the supply of fluid to and exhaust from the pistons, 7ª and 7ᵇ, of cylinder, 7. A partition, 7ᵈ, divides the cylinder into separate chambers for the respective pistons, the piston, 7ª, being connected to actuate the switch, and having a spring 7ᶜ, opposing the action of the fluid pressure.

When the vehicle is traveling at or above a certain speed, at which the governor raises the lever, 6, to close the exhaust and open both valves, 6ª and 6ᵇ, to admit fluid to both pistons, 7ª and 7ᵇ, the switch, 3ª, is held in full parallel position, as shown in the drawing. When the speed diminishes sufficiently to close one valve, 6ª, and open the exhaust from piston, 7ª, the spring, 7ᶜ, shifts the switch to the series-parallel position, at which point the piston, 7ª, engages piston, 7ᵇ, and is held until the speed is further reduced sufficiently for the governor to close valve, 6ᵇ, and open the exhaust from piston, 7ᵇ, whereupon the spring moves both pistons and the switch to the series position.

A booster, 4, is employed for raising the voltage of the current from the generators sufficiently above the line voltage to return current to the line, and to maintain the regenerated voltage as the speed diminishes, the booster being driven by a motor, 4ª, with current from the line through the wire, R, leading from the regenerative braking switch 2. One of the armature terminals of the booster is connected to the return lead, H, from the generators, the other armature terminal being connected by wire, S, with the line, T, through a contact bar on regenerative switch, 2. The field of the booster is energized by current from the line through wire, R, and may be controlled by a rheostat, 13, governed by the solenoid or magnet, 12, inserted in the regenerative circuit wire, S, whereby the strength of the booster field may be automatically adjusted by said regenerated current to maintain a substantially constant current regardless of fluctuations in line voltage or other conditions which might vary the output of the generators. The booster is also governed by the speed of the vehicle in order to compensate for the reduction in speed during the respective periods that the motors are connected up in their different relations by the change over switch, 3ª. This may be conviently done by inserting a rheostat, 5, in the field circuit of the motor, 4ª, the rheostat being controlled by the speed governor, 3. As shown in the drawing, a carbon rheostat is employed having a lever, 5ª, for exerting a varying pressure on the carbon disks to vary the resistance in the fields of the motor, 4ª. A spring, 8ᵇ, acts upon lever, 5ª, tending to diminish the pressure upon the carbon rheostat, and thereby increase the resistance, the force of the spring, 8ᵇ, being regulated by the movement of the weights of the governor, 3. Another spring, 8ᶜ, acts on the lever, 5ª, in the opposite direction and tends to increase the pressure on the carbon rheostat. The effective pressure acting on the rheostat is, therefore, the difference between the force of the springs, 8ᵇ and 8ᶜ, and as the shifting of the governor weights, due to variation in speed, also varies the force of the spring, 8ᵇ, the resistance of the rheostat, and consequently the speed of the motor, 4ª, is accordingly regulated to compensate for the diminishing speed of the motor generators. In order to continue this regulation through each period of regeneration for the different positions of the change over switch, 3ª, other springs, 8ᵈ and 8ᵉ, are mounted to act on the lever, 5ª, but are held out of operation by means of the pistons, 8ª and 8ᵇ, when the change over switch is in full parallel position, the valves, 6ª and 6ᵇ, also controlling the supply of fluid to these pistons. When these valves are operated by the governor, to release fluid from the pistons, 7ª and 7ᵇ, fluid is also released from pistons, 8ª and 8ᵇ, thus throwing the force of the springs, 8ᵈ and 8ᵉ, onto the lever, 5ª.

The coil of the magnet valve, 9, is inserted in the return wire, so that when the speed of the vehicle and the corresponding regenerated current has diminished, to a predetermined low amount, this valve is automatically opened to vent air from a pipe of the air brake system, and cause an application of the air brakes to complete the stop. Another vent valve, 10ª, is arranged to be operated to likewise vent air from the pipe of the air brake system when the speed of the vehicle exceeds a predetermined maximum degree, such vent valve being conveniently actuated by the governor through a lever, 10ᵈ, and a rod, 10ᵉ, connecting the same with the lever, 6. This maximum speed may be adjusted to any point desired by means of the hand lever device, 11, connected to shift the fulcrum of lever, 10ᵈ. It is preferred that this device be so adjusted as to cause an automatic application of the air brakes whenever the speed of the vehicle exceeds what may be safely controlled by means of the air brakes without the assistance of the regenerative braking system.

Communication from the pipe, 15, of the air brake system to the vent valves, 9 and 10ª is preferably controlled by a valve, 18, operated manually at the same time that the regenerative braking switch, 2, is thrown, and preferably attached thereto, whereby said communication is cut off when the brake switch is turned to the running position, and opened when the break switch is thrown to the position shown in the drawing for establishing the regenerative circuits. For the purpose of cutting off the regenerative circuits when the speed of the vehicle has reduced to the minimum, at which the vent valve, 9, is opened, a switch, 10, is inserted in the return wire, H, from the generators, the switch being held closed by piston, 10ᵇ, and air admitted through valve, 18, from the pipe, 15, of the air brake system when the brake switch, 2, and valve, 18, are turned to the position shown. When the vent valve, 9, is opened, it also releases the air pressure from piston, 10ᵇ, and the spring, 10ᶜ, then automatically opens the circuit, H. The maximum speed vent valve, 10ª, is, however, preferably so connected as to reduce the air pressure for causing an application of the air brakes, but not to release the pressure from piston, 10ᵇ. The switch, 10, thus remains closed at that time so that the combined braking effect from the regenerative system and the air brake system is produced. As soon as the speed is reduced to the predetermined safe amount for which the apparatus is adjusted, the vent valve, 10ª, closes, and the air brakes are automatically released, thus limiting the speed of the vehicle during the regenerative period.

When the brake switch is in running position, the vent valves, 9 and 10ª, are cut off from the pipe of the air brake system, by means of the valve, 18, which turns with the brake switch, but in braking position, as shown, communication is established from the pipe, 15, of the air brake system to both valves, 9, and 10ª, and also from the fluid pressure piston, 10ᵇ, to the vent valve, 9. The regenerative circuit switch, 10, is, therefore, normally held closed by the air pressure acting on piston, 10ᵇ.

As thus far described, the construction is similar to that of our prior application, except that the contacts on the controller, 2, are differently arranged to connect up the series-wound motors to act as generators in the regenerative braking circuit, and to build up the field magnets from their residual magnetism, as will be readily understood.

According to another feature of our present improvement, the braking circuit is not connected to the line until the voltage of the generated current is greater than the line voltage, and for this purpose an additional switch, 16, is provided in the return wire, S, for controlling the connection to the line and for closing the braking circuit independently through a resistance. According to the construction shown, this switch is provided with a contact bar adapted in one position to connect the wire, S, to the wire, Z, leading through the coil, 9ª, of magnet valve, 9, to the contact bar on the controller, 2, which is connected to the line T, and the wire, R, in the braking position, as shown, and in its other position to disconnect the wire, Z, and connect the wire, S, to the wire, U, and the ground through two parallel circuits, one including the heavy resistance, X, and the other the lower coil, 14ª, of the magnet valve device, 14, which controls the supply and release of fluid under pressure to and from one of the actuating pistons, 16ª, of the switch, 16. The upper coil, 14ᵇ, is permanently energized by current from the line through a branch from wire, R, to ground when the controller is in braking position. The supply of fluid to the other piston, 16ᵇ, is controlled by the valve, 18.

The switch, 16, also carries a contact bar adapted in one position to close a connection from a branch of the wire, R, to the wire, Y, leading through the coil, 9ᵇ, of magnet valve, 9, to ground; this being for the purpose of holding valve, 9, closed when the braking circuit is closed and the connection to wire, Z, and the line through the coil, 9ª, is open.

In all positions except that of braking, the valve 18, admits air under pressure to the piston, 16ᵇ, and the valve device, 14, at this time is in position for closing the supply of air to the piston, 16ª, and opening the exhaust therefrom to the atmosphere, as neither of the coils, 14ª or 14ᵇ, is energized. The switch, 16, therefore, normally occupies the position at the left in which the wire, Z, is disconnected and the wire, S, is connected to wire, U. The wire, R, is also electrically connected to the wire, Y, and coil, 9ᵇ, as shown in Fig. 2.

When the controller, 2, is thrown to the braking position, the valve, 18, is turned so as to cut off the supply of air to the piston, 16ᵇ, and open the exhaust therefrom to the atmosphere. At the same time the motors are connected up to act as generators in the braking circuit, and connection is made from the line, T, to the wire, R, for operating the booster motor, 4ª, and for energizing the magnet coils, 14ᵇ and 9ᵇ. The coil, 14ᵇ, then holds the valve, 14, in the same position and there is no movement of the switch, 16, which still connects the wires, S and U, so that the local brake circuit of the generators is closed through the resistance, X, and coil, 14ª, but is cut off from the line. The magnet valve, 9, is, however, held closed by the energizing of the lower coil, 9ᵇ, so that an undesired application of the air brakes is prevented, while the brake circuit is cut off from the line and the upper magnet coil, 9ª, consequently deënergized. As the motors then begin to generate current, the change over switch, 3ª, will occupy one of its three positions according to the speed of the vehicle, as determined by the governor, 3, and the strength of the current generated will rapidly increase as the fields are built up from their residual magnetism. The course of the current will be from the motors, connected either in full parallel, series-parallel or full series, by the return wire, H, through the booster, 4, wire, S, switch, 16, and wire, U, through resistance, X, and magnet coil, 14ª, to ground and the return side of the motors, as indicated in the dotted line position of switch, 16, in Figs. 3, 4, and 5. As soon as the strength of the generated current acting on the magnet coil, 14ª, is sufficient to overcome the effect of the line current acting on magnet coil, 14ᵇ, the valve device, 14, will be automatically shifted to close the exhaust and admit air under pressure to piston, 16ª, to throw the switch, 16, to its opposite position. The impressed voltage of the regenerated current is then sufficiently greater than the line voltage, and the connection to the line is thus made by the movement of the switch, 16, as before described, that is, the wire, S, is connected to wire, Z, leading through coil, 9ª, to contact bar on controller, 2, and the line, T. At the same time, the wire, U, leading through coil, 14ª, and the wire, Y, leading through coil, 9ᵇ, are cut out.

The further operation of the regenerative braking system in restoring energy to the line is substantially the same as that of our prior application, that is, supposing the change over switch, 3ª, to be in its full parallel position, as indicated, the course of the current will be from one terminal of each of the generators, connected in parallel, to return wire, H, through armature of booster, 4, wire, S, magnet coil, 12, switch, 16, wire, Z, magnet coil, 9ª, contact bar on switch, 2, to line, T, and return by ground connection to the other terminal of the generators, as indicated in diagram, Fig. 3.

If the regenerated current rises higher than a certain amount, the force of the magnetic pull of the core of the magnet, 12, acting on the lever, 12ª, will be increased and the pressure of spring, 12ᵇ, on the carbon rheostat diminished, so that less current from the line will flow through the rheostat and the fields of the booster, 4, will be correspondingly weakened, thus regulating the booster to decrease the amount of current flowing back to the line. This feature serves to keep the current flow properly balanced at all times. With the speed at the rate as above indicated, the weights of the governor, 3, move out radially to a position in which the lever, 6, clears the valves, 6ª and 6ᵇ, and a certain tension is exerted upon the spring, 3ᵇ, and transmitted to the lever, 5ª, acting upon the carbon rheostat, 5. With the valves, 6ª and 6ᵇ, in the positions shown, the exhausts are closed, and fluid pressure is admitted to all of the pistons, 7ª, 7ᵇ, 8ª and 8ᵇ, thereby relieving the lever, 5ª, from the force of the springs, 8ᵈ and 8ᵉ, so that the effective pressure acting on the carbon rheostat, 5, will be that which is produced by springs, 8ᶜ and 3ᵇ.

As the speed of the vehicle begins to diminish, due to the retarding effect produced by the generators in regenerating current and restoring same to the line circuit, the governor weights move inward, and thereby tend to increase the force of the spring, 3ᵇ. This has the effect of varying the pressure of lever, 5ª, upon the carbon rheostat, 5, and thereby regulating the motor, 4ª, driving the booster, 4, so as to compensate for the diminishing speed of the vehicle and the generators, and maintain the voltage of the regenerated current above that of the line circuit. As the speed continues to diminish, the further inward movement of the governor weights serves to depress the lever, 6, sufficiently to operate the valve, 6ª, to close its supply port and open its exhaust port, whereupon the fluid is released from pistons, 7ª and 8ª. The spring, 7ᶜ, then moves the piston, 7ª, downward against the stem of piston, 7ᵇ, and throws the switch, 3ª, to its series-parallel position, whereby the voltage generated will be increased, and thereby compensate for the diminished speed of the vehicle. The course of the current in this position of the switch is indicated in Fig. 4. In order to make a corresponding reduction in the speed of the booster to maintain the voltage of the regenerated current substantially constant, the spring, 8ᵈ, is released and exerts its pressure on lever, 5ª, and rheostat, 5. The field of the motor, 4ª, is thereby strengthened and the speed of the booster reduced the desired amount. The current will then be restored to the line throughout another period of further reduction in the speed of the vehicle, during which period the regulation of the motor, 4ª, of the booster, by means of rheostat, 5, spring, 3ᵇ, and governor, will be repeated as before described.

As the speed continues to decrease, the governor weights move farther inward, and depress the lever, 6, to operate the valve 6ᵇ, thereby releasing fluid from pistons, 7ᵇ and 8ᵇ. The spring, 7ᶜ, then moves the piston farther downward, and throws the switch, 3ᵃ, to the full series position, thus again raising the voltage of the regenerated current. The course of the current in this position is indicated in Fig. 5. The spring, 8ᵉ, is released by the exhaust of fluid from the piston, 8ᵇ, and adds its force to that of springs, 8ᶜ and 8ᵈ, acting on the lever, 5ᵃ, thus again adjusting the rheostat, 5, to reduce the speed of the motor, 4ᵃ, and booster, 4, to correspond with the changed relation of the generators.

The voltage of the regenerated current is thus maintained high enough to flow to the line circuit throughout nearly the full stopping period, but when the speed is reduced to such a low rate that the current fails to hold the magnet valve, 9, closed, this valve opens to vent air from the pipe, 15, and effect an application of the air brakes to complete the stop. The fluid will also be released from the piston, 10ᵇ, at the same time, and the spring, 10ᶜ, operates the switch, 10, to open the regenerative circuit to prevent back flow of current from the line.

If, at the time the brake switch is turned to braking position, the speed of the vehicle is in excess of the desired maximum, as determined by the adjustment of the device, 11, the vent valve, 10ᵃ, will be immediately operated by the governor to discharge air from the air brake system and effect an application of the air brakes. The regenerative braking effect will also be obtained, and the combined action of the two braking systems will soon reduce the speed to a safe amount.

This system gives a great amount of flexibility of action as the two braking systems operate in perfect harmony. It is not possible for one system to oppose the other at any time or at any speed, and the air brake may be used to supplement the action of the regenerative braking system at any time, as desired.

Having now described my invention, what I claim as new and desire to secure by Letters Patent is:

1. In a regenerative braking system, the combination with a plurality of series-wound motors, of a brake switch having contacts for connecting one field lead and one armature lead of each motor, and other contacts for connecting the other field and armature terminals with a series parallel switch, and a series parallel switch governed by the speed of the vehicle for automatically shifting the relation of said motors.

2. In a regenerative braking system, the combination with a plurality of motors, of a brake switch having contacts for connecting up the motors to act as generators in a local braking circuit, a switch for controlling the connection between said braking circuit and the line, a fluid pressure device for actuating said switch, and means governed by the voltage of the braking circuit for controlling the fluid pressure.

3. In a regenerative braking system, the combination with a plurality of motors, of a brake switch having contacts for connecting up the motors to act as generators in a local braking circuit, a switch for controlling the connection between the braking circuit and the line, means governed by the movement of the brake switch for shifting said circuit switch to one position for cutting out the line connection, and means governed by the voltage of the braking circuit for shifting said switch to another position to close connection with the line.

4. In a regenerative braking system, the combination with a plurality of motors, of a brake switch having contacts for connecting up the motors to act as generators in a local braking circuit, and switch mechanism governed by the movement of the brake switch and by the voltage of the braking circuit for controlling the connection between said circuit and the line.

5. In a regenerative braking system, the combination with a plurality of motors, of a brake switch having contacts for connecting up the motors to act as generators in a local braking circuit, a switch for controlling the connection between the braking circuit and the line, a piston for actuating said switch, a valve device controlling the pressure acting on said piston, and two opposing magnet coils for operating said valve device, one coil being energized from the braking circuit and the other from the line.

6. In a regenerative braking system, the combination with a plurality of motors, a brake switch having contacts for connecting up the motors to act as generators in a local braking circuit, and means for automatically connecting the braking circuit to the line when the voltage in said circuit rises above the line voltage, of an air brake system, a vent valve for effecting an application of the air brakes when the speed of the generators falls below a predetermined minimum, a magnet coil for the vent valve energized by the current restored to the line, and means for holding said vent valve closed before the braking circuit is connected to the line.

7. In a regenerative braking system, the combination with a plurality of motors, a brake switch having contacts for connecting up the motors to act as generators in a local braking circuit, and switch mechanism for automatically connecting said circuit to the line when the voltage of said circuit exceeds the line voltage, of an air brake system, a magnet valve controlled by the regenerated current restored to the line for effecting an application of the air brakes when the speed of the regenerators falls below a predetermined amount, said valve also being controlled by current from the line while the braking circuit is being built up to the line voltage.

8. In a regenerative braking system, the combination with a plurality of motors, a brake switch having contacts for connecting up the motors to act as generators in a local braking circuit, and switch mechanism for automatically connecting said circuit to the line when the voltage of said circuit exceeds the line voltage, of an air brake system, a magnet valve controlled by the regenerated current restored to the line for effecting an application of the air brakes when the speed of the regenerators falls below a predetermined amount, and a magnet coil energized by current from the line for holding said valve closed when the generators are building up the current in the braking circuit and before the connection is made from said circuit to the line.

9. In a regenerative braking system, the combination with a plurality of motors, a brake switch having contacts for connecting up the motors to act as generators in a local braking circuit, and switch mechanism for automatically connecting said circuit to the line when the voltage of said circuit exceeds the line voltage, of an air brake system, a magnet valve controlled by the regenerated current restored to the line for effecting an application of the air brakes when the speed of the regenerators falls below a predetermined amount, a magnet coil energized by current from the line for holding the valve closed, and means actuated by said switch mechanism for cutting off the line connection to said magnet coil.

WALTER V. TURNER.
THOMAS H. THOMAS.